United States Patent [19]

Sato

[11] Patent Number: 5,095,485
[45] Date of Patent: Mar. 10, 1992

[54] MICROPROCESSOR EQUIPPED WITH PARITY CONTROL UNIT ON SAME CHIP

[75] Inventor: Yoshikuni Sato, Tokyo, Japan
[73] Assignee: NEC Corporation, Tokyo, Japan
[21] Appl. No.: 371,222
[22] Filed: Jun. 26, 1989
[30] Foreign Application Priority Data
   Jun. 24, 1988 [JP] Japan .................. 63-157328
[51] Int. Cl.$^5$ .................................. G06F 11/10
[52] U.S. Cl. .................. 371/51.1; 364/265.6; 364/266.3; 364/DIG. 1
[58] Field of Search ............ 371/51.1, 40.1, 16.1; 364/265.6, 266.3

[56] References Cited

U.S. PATENT DOCUMENTS

| | | |
|---|---|---|
| 4,355,393 | 10/1982 | Kubo et al. ................ 371/51.1 |
| 4,625,273 | 11/1986 | Woffinden et al. .......... 364/200 |
| 4,670,876 | 6/1987 | Kirk ............................. 371/49.1 |
| 4,805,173 | 2/1989 | Hillis et al. .................. 371/40.1 |

Primary Examiner—Charles E. Atkinson
Attorney, Agent, or Firm—Foley & Lardner

[57] ABSTRACT

A microprocessor having a on-chip redundant control unit is disclosed. This processor includes a set of data terminals, an execution unit and a data bus buffer coupled between the set of data termianls and the execution unit, and the data bus buffer fetches data on the set of data termianls in resopnse to a first timing signal and transfers the fetched data to the execution unit in response to a second timing signal. The on-chip redundant control unit receives the fetched data and redundant information and checks the validity of the fetched data in response to the redundant information before the generation of the second timing signal, so that an effective memory access time is not prolonged.

10 Claims, 7 Drawing Sheets

MICROPROCESSOR EQUIPPED WITH PARITY CONTROL UNIT ON SAME CHIP

BACKGROUND OF THE INVENTION

1. Field of the Invention

The present invention relates to a microprocessor and, more particularly, to a microprocessor for structuring a high reliability data processing system.

2. Description of Related Art

As one technique for structuring a high reliability data processing system, it is known in the art to add redundant information to data. In a system employing a parity bit as redundant information, data read out of a memory is checked for validity by checking the parity bit information added thereto. This data processed by the microprocessor is written into the memory together with the parity bit information.

Referring to FIG. 1, there is shown such a prior art data processing system. A microprocessor 701 is interconnected through a system control bus 704, a system address bus 705 and a system data bus 706 to a program/data memory 702 storing a program and operand data to be executed and processed. The program and data stored in the memory 702 are called hereinafter "data". There are further provided a parity bit memory 703 and a parity control circuit 708. The memory 703 is connected to the system control and address buses 704 and 705, and the control circuit 708 is connected to the system control and data buses 704 and 706. The memory 703 and the control circuit 708 are interconnected through a parity bit line 707. The control circuit 708 supplied a data valid/invalid indication signal 709 and a ready signal 710.

In a data read operation, the microprocessor 701 accesses to desired addresses of the memories 702 and 703 by means of the control and address buses 704 and 705. The data read out of the accessed address is transferred via the data bus 706 to the microprocessor 701 and further to the parity control circuit 708. Moreover, parity bit information added to the data read out of the memory 702 is read out from the parity bit memory 703 and transferred to the control circuit 708 via the line 707. The parity control circuit 708 calculates a syndrome of the data supplied thereto and compares the calculation resultant with the parity bit information. During the calculation, the control circuit 708 changes the ready signal 710 to an inactive level to inform the microprocessor 701 of the circuit 708 state of calculating. When the calculation is completed, the control circuit 708 changes the ready signal 710 to an active level and informs, by the signal 709, the microprocessor 701 whether or not the data read out of the memory 702 is valid.

In a data write operation, the microprocessor 701 accesses desired addresses of the memories 702 and 703 by means of the control and address buses 704 and 705 and transfers data to be written onto the data bus 706. This data is written into the accessed address of the memory 702 and further supplied to the parity control circuit 708. The circuit 708 calculates a syndrome of the data and produces parity bit information which is in turn written into the accessed address of the memory 703 through the line 707. During the syndrome calculation, the circuit 708 supplied the inactive level ready signal 710 to the microprocessor 701.

Thus, a high reliability system can be structured. As apparent from the above description, however, an effective memory access time is determined by the summation of an access time required by the memory 702 and a syndrome calculation time required by the parity control circuit 708. For this reason, the microprocessor cannot perform a data processing operation at a high speed to reduce the performance of the system.

SUMMARY OF THE INVENTION

Therefore, an object of the present invention is to provide a microprocessor having an on-chip redundant information control unit for shortening an effective memory access time.

Another object of the present invention is to provide a microprocessor in which a redundant information control unit is fabricated as an on-chip unit together with a control circuit for controlling activation/inactivation of the redundant information control unit.

A microprocessor according to one aspect of the present invention comprises, a single semiconductor chip, a set of data terminals with a redundant information terminal, an internal data bus, first means coupled to the set of data terminals and responsive to a first timing signal for fetching data on the set of data terminals, second means coupled between the first means and the internal bus for transferring the data from the first means to the internal bus in response to a second timing signal which is generated after the first timing signal, and a redundant information control unit coupled to the redundant information terminal and the first means for checking the data from the first means to be valid or not on the base redundant information applied to the redundant information terminal and for outputting the checking resultant.

Accordingly, the redundant information control unit can check the validity of the data fetched in the microprocessor before the data appears on the internal data bus, so that the data checking time of the control unit does not influence an effective memory access time.

According to another aspect of the present invention, there is provided a microprocessor comprising, a single semiconductor chip, with a set of data terminals, a redundant information terminal, an execution unit for processing data fetched from the set of data terminals, a redundant information control unit coupled to the set of data terminals and the redundant information terminal for checking validity of the fetched data in response to information from the redundant information terminal and producing a checking resultant signal, and means coupled between the control unit and the execution unit and supplied with a redundant enable signal for transferring the checking resultant signal to the execution unit when the redundant enable signal assumes an active level and for supplying a signal representing that the fetched data is valid to the execution unit irrespective of the checking resultant signal when the redundant enable signal assumes an inactive level.

Accordingly, in the application of this microprocessor to a system employing no redundant information, it is sufficient to supply the redundant enable signal of the inactive level, so that no external control circuitry or the redundant information terminal is required.

BRIEF DESCRIPTION OF THE INVENTION

The above and other objects, advantages and features of the present invention will be more apparent from the following description taken in conjunction with the accompanying drawings, in which.

DETAILED DESCRIPTION OF THE PREFERRED EMBODIMENTS

Figure 2:
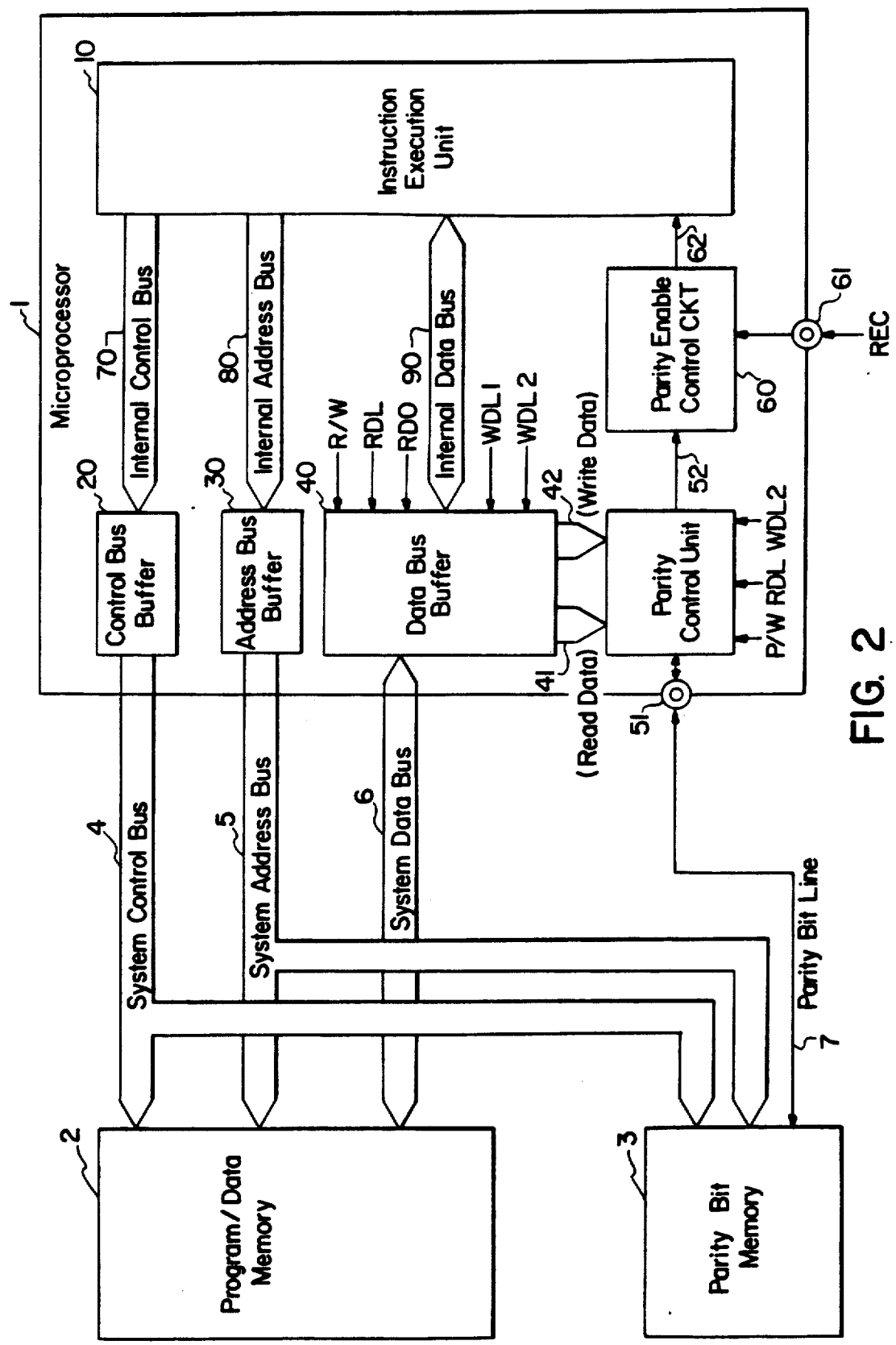
FIG. 2 is a block diagram representative of a data processing system employing a microprocessor according to an embodiment of the present invention.

Referring to FIG. 2, a microprocessor 1 according to an embodiment of the present invention is fabricated as a monolithic semiconductor integrated circuit device and is interconnected through a system control bus 4, a system address bus 5 and a system data bus 6 to a program/data memory 2 storing a program and operand data called data hereinafter to be executed and processed. the microprocessor 1 is further interconnected through The system control and address buses 4 and 5 and a parity bit line 7 to a parity bit memory 3 storing parity bit information as redundant information. The parity bit line 7 is connected to a parity terminal 51 of the processor 1. The microprocessor 1 includes an instruction execution unit 10 for executing program instructions and performing read/write operations on operand data. The unit 10 outputs a set of control signals onto the system control bus 4 via an internal control bus 70 and a control bus buffer 20 and a set of address signals onto the system address bus 5 via an internal address bus 80 and an address bus buffer 30. A data bus buffer 40 and an internal data bus 90 are of a bidirectional type and interconnect the execution unit 10 and the system data bus 6. The data bus buffer 40 is supplied with control signals R/W, RDL, RDO, WDL1 and WDL2 for data read/write operation via the internal control bus 70 and/or directly from the instruction execution unit. The signal R/W is a date read/write signal for designating a data read operation or a data write operation. The signal RDL is a read data latch signal used as a first timing signal for fetching read-data on the system data bus 6 into the microprocessor 1, and the signal RDO is a read data output signal used as a second timing signal for transferring the fetched read-date onto the internal data bus 90. The signal WLD1 is a first write data latch signal used for fetching write-data on the internal data bus 90 into the data bus buffer 40, and the signal WDL2 is a second write data latch signal used for transferring the fetched write-data onto the system data bus 6. The read-data fetched onto the data bus buffer 40 by the timing signal RDL is transferred via a set of read-data lines 41 to an on-chip parity control unit 50. This unit 50 calculates a syndrome of the fetched read-data and produces a data validity indication signal 52 in response to a parity bit information supplied from the terminal 51, the signal 52 being in turn supplied to a parity enable control circuit 60. The unit 50 is further supplied with the control signals R/W, RDL and WDL2. The control circuit 60 is also supplied with a parity enable signal REC from a terminal 61.

When a redundant control function is employed, the signal REC is fixed to logic "0" as an active level. On the other hand, in case where the redundant control function is not employed, the signal REC is fixed to logic "1" as an inactive level. A signal 62 derived from the enable control circuit 60 is supplied to the execution unit 10. The write-data fetched into the buffer 40 by the control signal WDL1 is transferred to the control unit 50 via a set of write-data lines 42. The unit 50 calculates a syndrome of the write-data to produce parity bit information which is in turn transferred onto the line 7 via the terminal 51.

Figure 3:
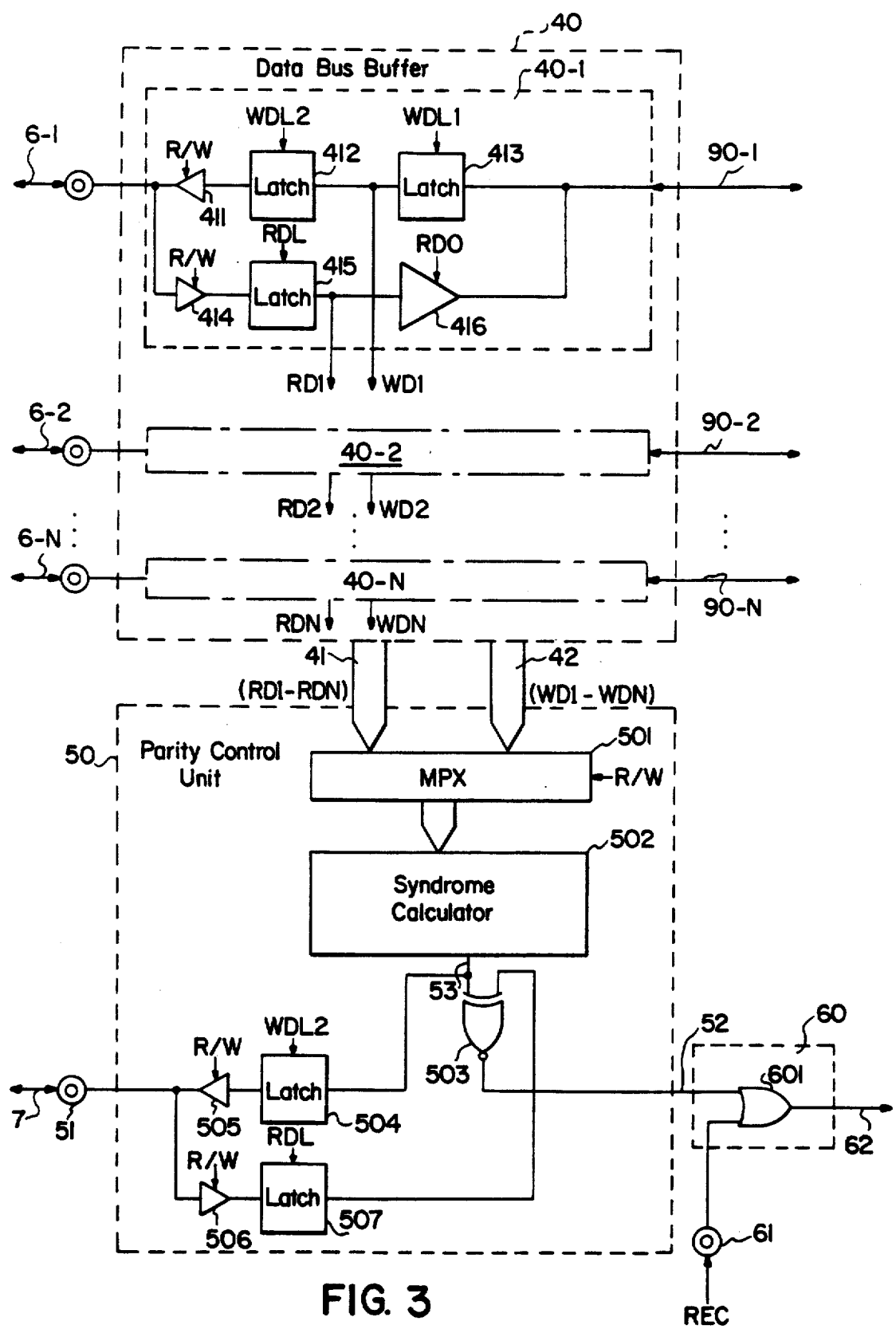
FIG. 3 is a detailed block diagram representative of a data bus buffer, a parity control unit and a parity enable control circuit of the microprocessor shown in FIG. 1.

Referring to FIG. 3, the data bus buffer 40 includes N pieces of buffer units 40-1 to 40-N for implementing the interface between the system data bus 6 consisting of N bus lines 6-1 to 6-N and the internal data bus 90 consisting of N bus lines 90-1 to 90-N. Since each of the buffer units 40-1 to 40-N has the same construction as one other, only the first unit 40-1 is shown in FIG. 3. A latch circuit 413 latches write-data on the internal bus line 90-1 in response to the signal WDL1 and a latch circuit 412 latches the output of the latch circuit 413 in response to the signal WDL2. An output buffer circuit 411 is controlled by the signal R/W and transfers the output of the latch circuit 412 onto the system data bus line 6-1 in the data write operation mode. The output of the circuit 411 is brought into a high impedance state in the data read operation mode. An input buffer circuit 414 is activated in the data read mode and deactivated in the data write mode under the control of the signal R/W. A latch circuit 415 latches the output of the input buffer circuit 411, i.e. read-data on the system data bus line 6-1, in response to the signal RDL. An output buffer circuit 416 transfers the output of the latch circuit 415 onto the internal data bus line 90-1 in response to the signal RDO. The output of the latch circuit 415 is derived as one bit read-data RD1 and the output of the latch circuit 413 is derived as one bit write-date WD1. The read-data of N bits RD1 to RDN and the write-data of N bits WD1 to WDN are supplied to a muliplexer 501 in the parity control unit 50 via the data lines 41 and 42, respectively. The multiplexer 501 is controlled by the signal R/W and selects the read-data RD1 to RDN in the data read mode and the write-data WD1 to WDN in the data write mode. The selected data from the multiplexer 501 is supplied to a syndrome calculator 502 to calculate syndrome thereof. Since the construction and operation of the calculator 502 are well known in the art and the present invention does not relate directly to the calculator 502, detailed description thereof is omitted in order to avoid complexity in the drawing. The calculation resultant signal 53 of the calculator 502 is supplied to one input of an exclusive NOR gate (EX-NOR gate) 503 and is latched into a latch circuit 504 in response to the signal WDL2. The output of the latch circuit 504 is transferred onto the line 7 in the data write mode by an output buffer circuit 505 controlled by the signal R/W. An input buffer circuit 506 is activated by the R/W signal in the data read mode to transfer the parity bit information to an latch circuit 507. This circuit 507 latches the parity bit information in response to the signal RDL and supplies the same to the other input of the EX-OR gate 503. The output of the EX-OR gate 503 is derived as the data validity indication signal 52 representing whether or not the read-data is valid. The parity enable control circuit 60 consists of an OR gate 601. As mentioned hereinbefore, the enable signal REC is fixed to logic "0"

in the case of employing the redundant control function, and therefore the OR gate 52 transfers the data validity indication signal 52 to the instruction execution unit 10 as the signal 62. In the case of employing no redundant control function, the enable signal REC is fixed to logic "0", so that the output signal 62 of the OR gate 61 is held at logic "1" irrespective of the signal 52. Accordingly, the execution unit 10 regards all the read-data as being valid. No control circuit for controlling the parity hit terminal 51 is therefore required.

Figure 4:
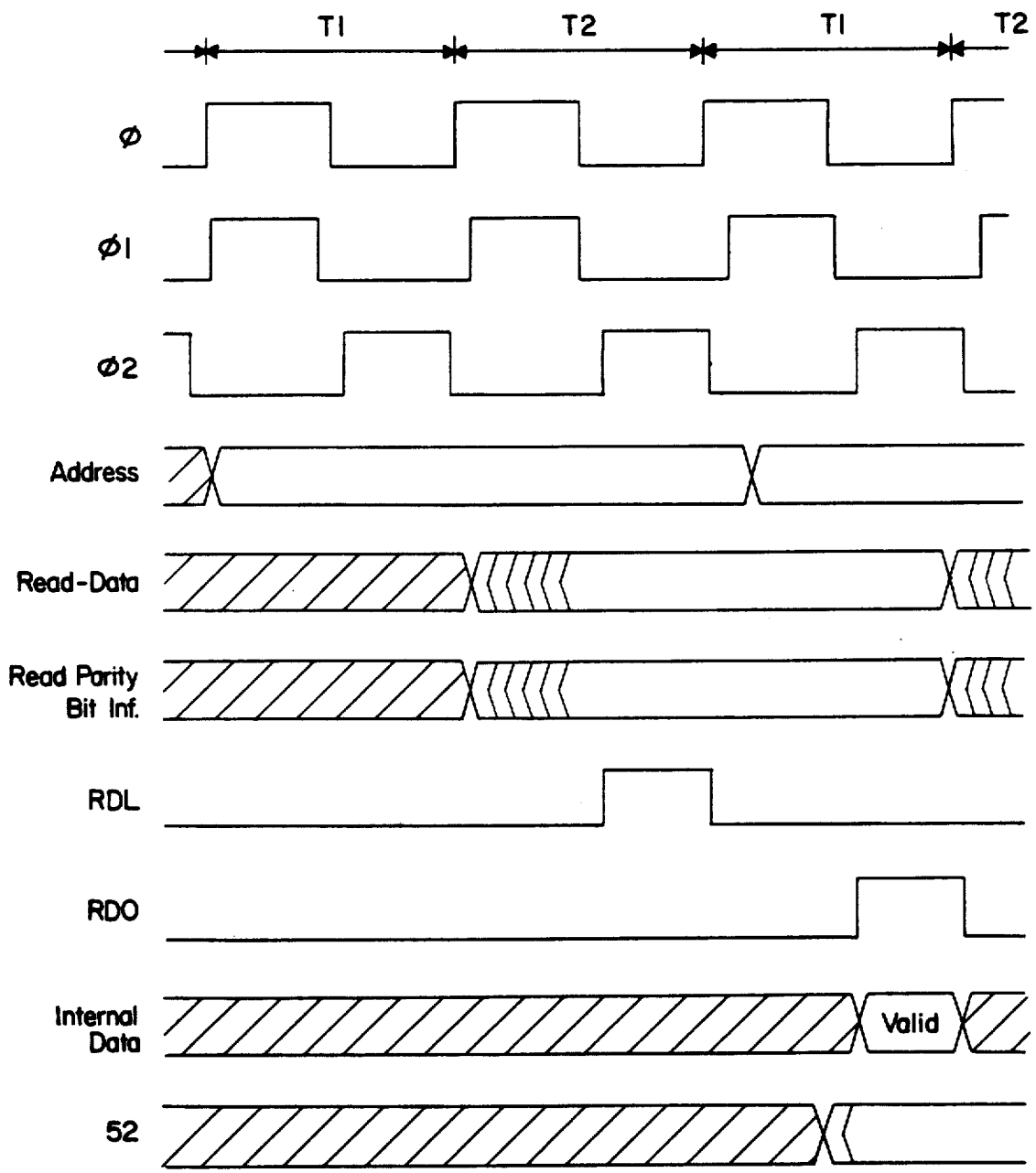
FIG. 4 is a timing chart representative of a data read operation of the microprocessor shown in FIG. 1.
Figure 5:
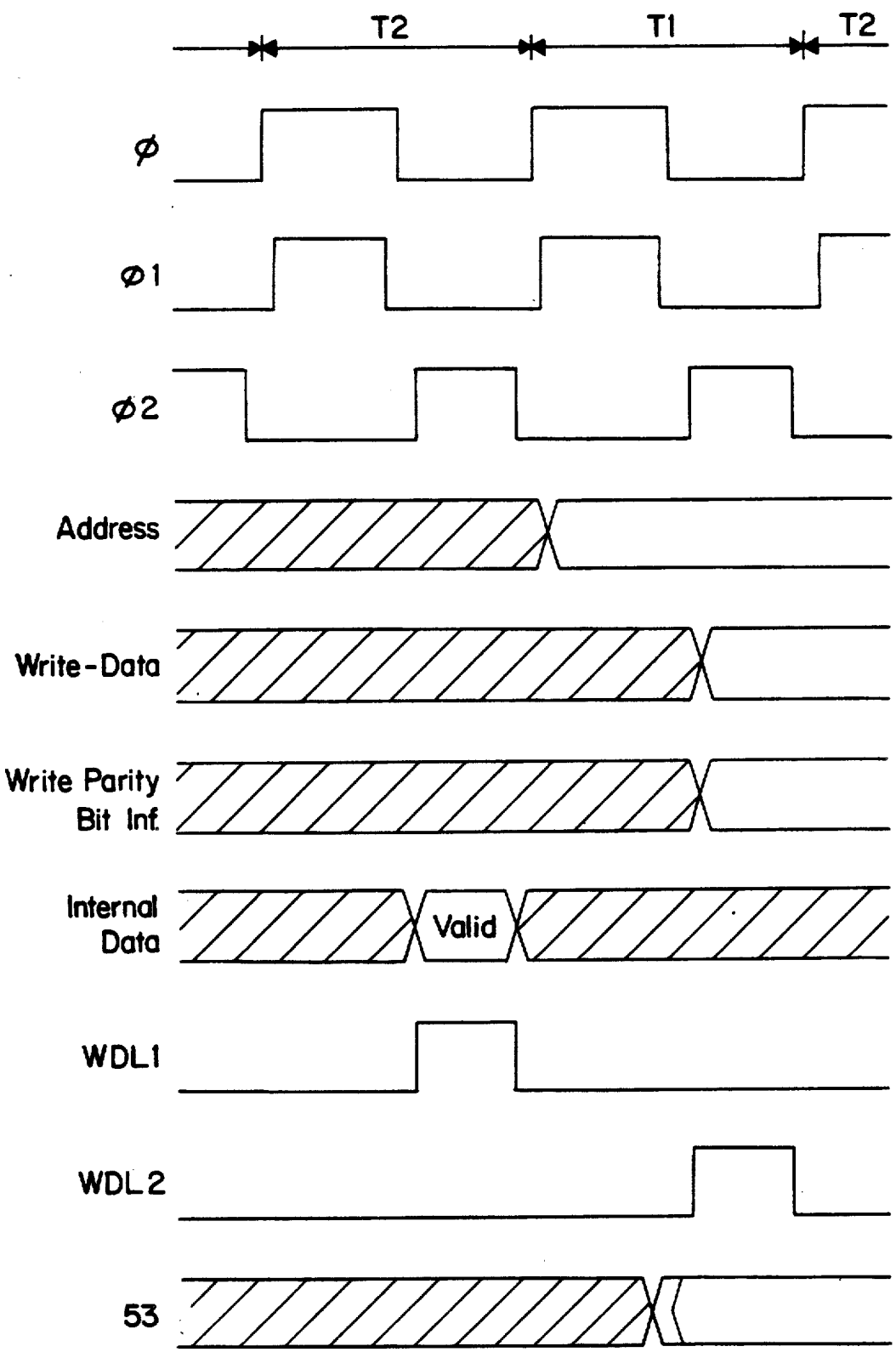
FIG. 5 is a timing chart representative of a data write operation of the microprocessor shown in FIG. 1.

The data read operation and data write operation of the processor 1 will be described below with reference to FIGS. 2 and 3 and further to FIGS. 4 and 5 representing the data read and write timing charts, respectively. In the present microprocessor 1, each bus cycle for the data read/write operation is composed basically of two clocks (T1 and T2 states) of a system clock signal $\phi$. Based upon this clock signal $\phi$, two timing clock signals $\phi 1$ and $\phi 2$ different in phase from each other are produced to generate the above timing signals RDL, RDO, WDL1 and WDL2.

In the data read operation (FIG. 4), the microprocessor 1 outputs a set of address signals on the system address bus 5 and a set of data read control signal on the system control bus 4 to access desired addresses of the memories 2 and 3 at the beginning of the data read bus cycle. The data read out of the accessed address of the memory is transferred to the system data bus 6 and the parity bit information read of the accessed address of the memory 3 is transferred to the line 7. The execution unit 10 generates the read data latch signal RDL in synchronism with the timing clock $\phi 2$ occurring in the T2 state, so that the read-data on the system data bus 6 is fetched in the latch circuit 415 and transferred to the syndrome calculator 502. The parity bit information on the line 7 is fetched in the latch circuit 507. By the falling of the signal RDL to logic "0", the latch circuit 415 closes the input gate thereof to hold the read-data therein. In synchronism with the timing clock $\phi 2$ occurring in the T1 state after the T2 state, the execution unit 10 produces the read data output signal RDO, so that the data output buffer 416 transfers the read-data from the latch circuit 415 onto the internal data bus 90. On the other hand, the syndrome calculator 502 receives the read-data at the timing of the generation of the signal RDL and calculates the syndrome thereof. The calculated resultant is compared by the EX-OR gate 503 with the parity bit information from the latch circuit 507 and the comparison resultant 52 is supplied to the execution unit 10 via the OR gate 601. There is a time period corresponding to one clock of the clock signal $\phi$ from a time point at which the data bus buffer 40 fetches the read-data on the system data bus 6 to a time point at which the data bus buffer 40 transfers the fetched read-data onto the internal data bus 90. During this time period, the parity control unit 50 can check the validity of the read-data. Accordingly, the checking time required by the unit 50 does not appear in the read data bus cycle. If the signal 52 from the unit indicates the invalidity of the read-data, the execution unit 10 restarts the read-data bus cycle or suspends the data processing operation.

In the data write operation (FIG. 5), the execution unit 10 transfers data to be written, i.e. write-data, onto the internal data bus 90 in synchronism with the timing clock $\phi 2$ occurring in the T2 state just before the data write bus cycle to be executed, and further generates the data latch signal WDL1. In response to the signal WDL1, the latch circuit 413 fetches the write-data on the internal data bus 90 and supplies the same to the syndrome calculator 502. The calculator 502 starts to calculates the syndrome thereof. At the beginning of the data write bus cycle, a set of write-address data is transferred onto the system address bus 5. The execution unit 10 generates the signal WDL2 in synchronism with the timing clock $\phi 2$ occurring in the T1 state. In response to the signal WDL2, the latch circuit 412 fetches the write-data from the latch circuit 413 and transfers the same onto the system data bus 5 via the output buffer circuit 411. Since a time period from the generation of the signal WDL1 to that of the signal WDL2 corresponds to one clock time of the clock signal $\phi$, the calculator 502 completes the calculation of the syndrome of the write-data during that time period. The calculated resultant 53 is fetched in the latch circuit 504 in response to the signal WDL2 and transferred onto the parity bit line 7 via the output buffer circuit 505 and the terminal 51. The write-data on the system data bus 6 and the parity bit information on the line 7 are written into the accessed addresses of the memories 2 and 3, respectively. Thus, the syndrome calculation time also does not appear in the data write bus cycle.

As described above, the microprocessor 1 has the on-chip parity control unit 50 without prolonging each of the data read and write bus cycles. Moreover, the microprocesor 1 can be easily applied to a system employing no parity bit control function.

In order to further enhance the reliability of a system, an address for accessing an external memory or peripheral unit may be added with parity bit information. A microprocessor applicable to such a system is shown in FIG. 6 as another embodiment of the present invention.

The present microprocessor 1 further includes an address parity bit control unit 110 for adding parity bit information to an address to be transferred onto the system address bus 5. This unit 110 includes a calculator 112 for calculating the syndrome of the address to produce address parity bit information 115, a latch circuit 113 for fetching the information 115 in response to a second address latch timing signal AL2 and an output buffer circuit 114 for transferring the output of the latch circuit 113 onto an address parity bit line 120 via an address parity bit terminal 111. The buffer 114 is brought into a high impedance state by a signal HQ generated when the microprocessor 1 is in a hold or halt state. The address data buffer 30 includes buffer units 30-1 to 30-M coupled respectively between each of the internal address bit lines 80-1 to 80-M and each of the system address bit lines 5-1 to 5-M. Each of the units 30-1 to 30-M includes a latch circuit 301 for fetching an internal address in response to a first address latch timing signal AL1, a latch circuit 302 for fetching the output of the latch circuit 301 in response to the signal AL2 and an output buffer circuit 303 controlled by the signal HQ.

Figure 7:
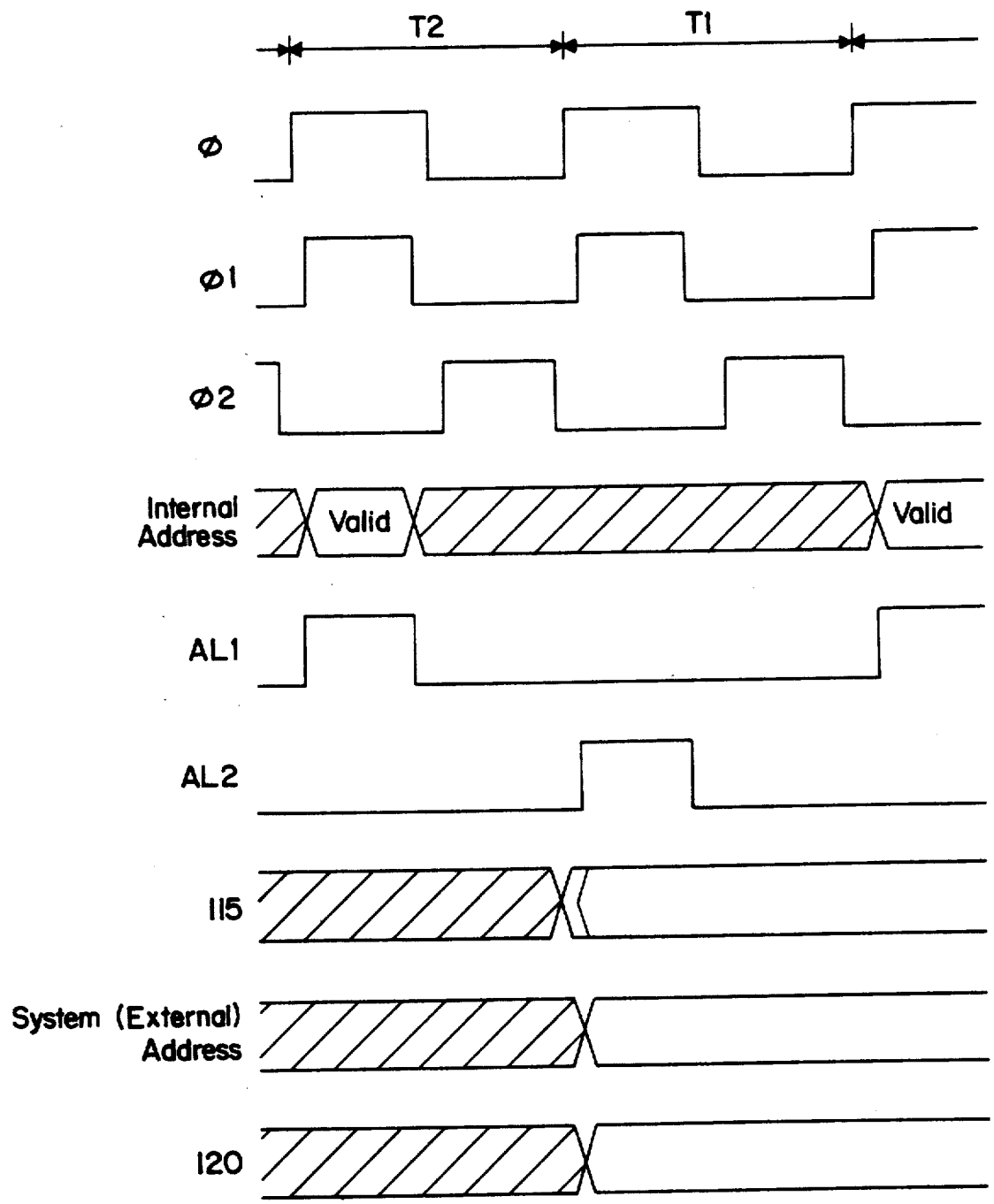
FIG. 7 is a timing chart representative of an address output of the microprocessor shown in FIG. 6.

As an address output timing chart is shown in FIG. 7, the execution unit 10 transfers an address onto the internal address bus 80 and generates the signal AL1 in synchronism with the timing clock $\phi 1$ occurring in the T2 state just before the bus cycle to be executed. In response to the signal AL1, the latch circuit 301 fetches the address on the bus 80 and transfers the same to the syndrome calculator 112. The execution unit 10 thereafter generates the signal AL2 in synchronism with the timing clock $\phi 1$ occurring in the T1 state. As a result, the address is fetched in the latch circuit 302 and transferred onto the system address bus 5 via the output buffer 303. Since a time period from the generation time of the signal AL1 to that of the signal AL2 corresponding to one clock time period of the clock signal φ, the calculator 112 completes the calculation of the address syndrome during that time period. The address parity bit information 115 is thus fetched in the latch circuit 113 in response to the signal AL2 and transferred onto the line 120 via the buffer 114 and the terminal 111.

Figure 1:
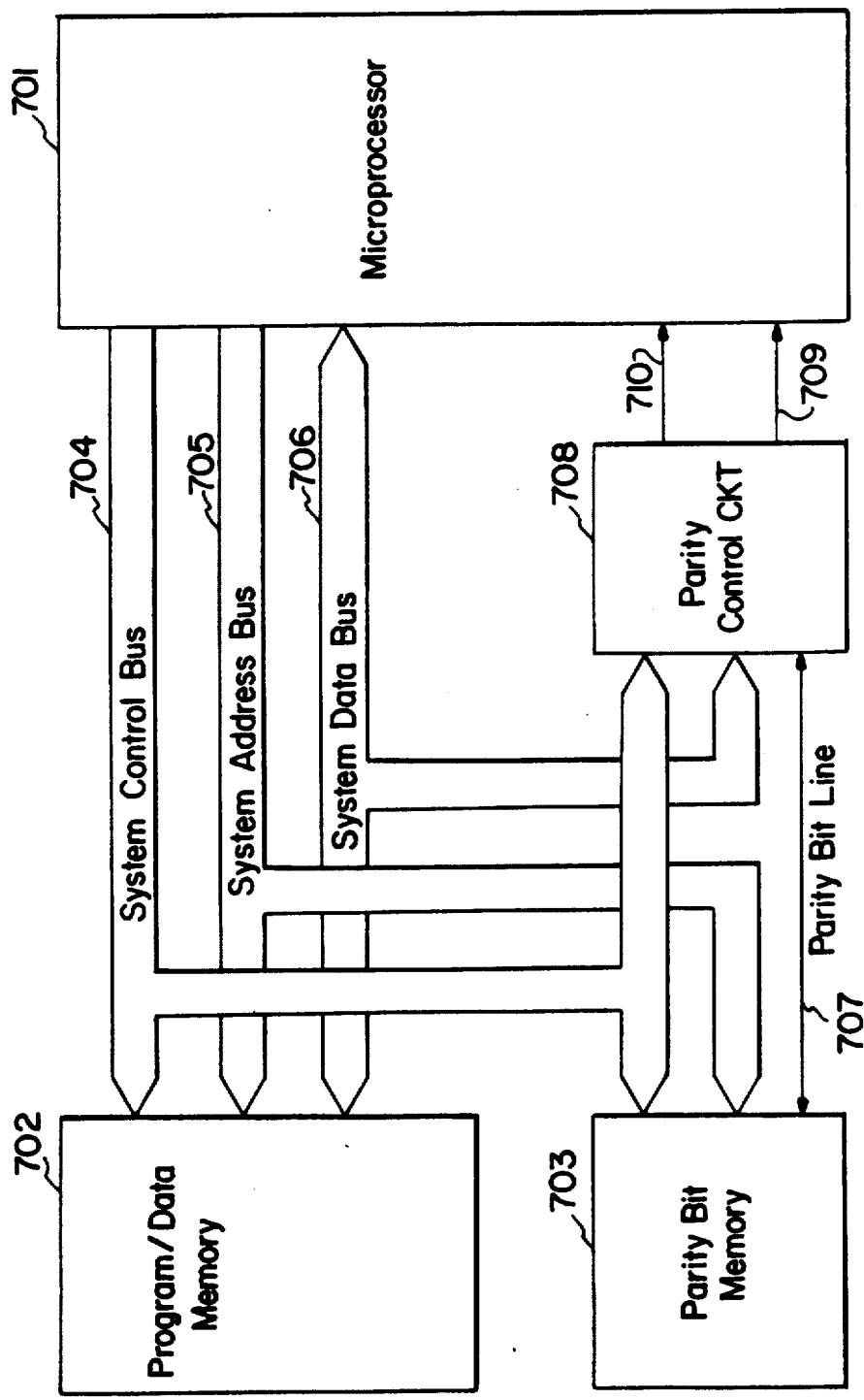
FIG. 1 is a block diagram representative of a data processing system according to prior art.
Figure 6:
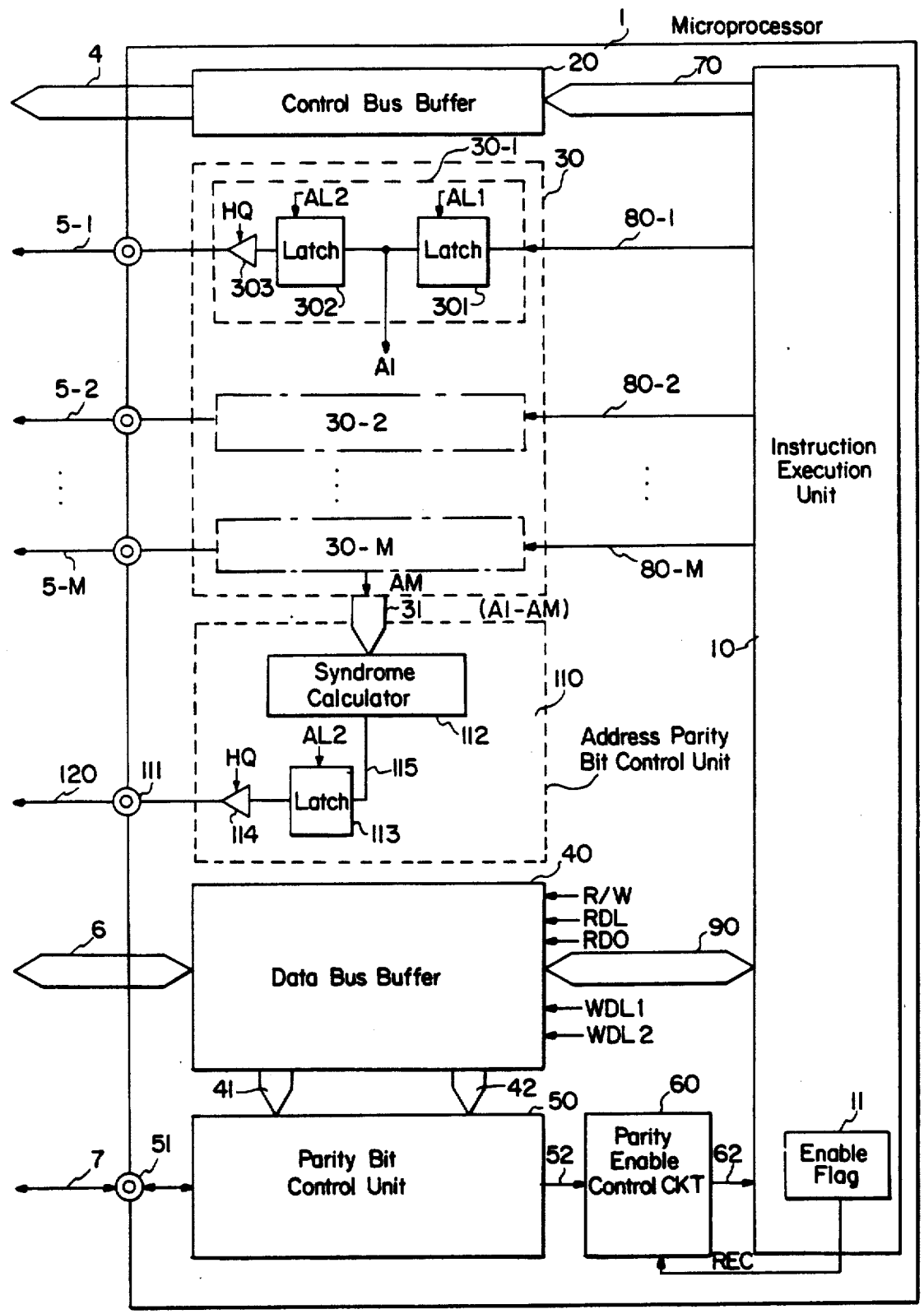
FIG. 6 is a block diagram representative of another embodiment of the present invention.

The microprocessor 1 shown in FIG. 6 is further different from that shown in FIG. 2 in that a parity enable control flag 11 is provided in the execution unit 10 and the set/reset signal thereof is utilized as the parity enable control signal REC in place of the externally supplied signal shown in FIG. 2. The set state of the enable control flag 11 disables the data parity control function, whereas the reset state thereof enables this function. The parity enable control signal REC can be supplied to the microprocessor 1 from the outside thereof, similarly to FIG. 1. Inversely, the parity enable control flag 11 can be provided in the microprocessor shown in FIG. 1.

In the above embodiments, the parity bit is employed as the redundant information, but other type redundant information may be employed. Moreover, two or more redundant information control units of different types from each other may be provided in a microprocessor and one of them may be selectively activated in accordance to a system to be structured.

The present invention is not limited to the above embodiments, but may be modified and changed without departing from the scope and spirit of the invention.

What is claimed is:

1. A microprocessor comprising:
    (a) an instruction execution unit;
    (b) a set of data terminals;
    (c) an internal data bus coupled to said instruction execution unit;
    (d) a data bus buffer coupled between said set of data terminals and said internal data bus, said data bus buffer including first means responsive to a first timing signal for fetching data on said set of data terminals and second means responsive to a second timing signal for transferring data from said first means onto said internal data bus;
    (e) a redundant information terminal supplied with redundant information;
    (f) a redundant control unit coupled to said redundant information terminal;
    (g) a third means coupled between said first means and said redundant control unit for transferring data fetched in the first means to said redundant control unit, said redundant control unit checking validity of data supplied from said first means in response to said redundant information and producing a resultant signal representing whether or not data supplied from said first means is valid; and
    (h) fourth means for supplying said resultant signal to said instruction execution unit.

2. The microprocessor as claimed in claim 1, wherein said data bus buffer further includes:
    fifth means responding to a third timing signal for fetching data on said internal data bus;
    sixth means responsive to a fourth timing signal for transferring data from said third means to said set of data terminals; and
    said microprocessor further comprises:
    (h) seventh means coupled between said fifth means and said redundant control unit for transferring data fetched in said fifth means to said redundant control unit, said redundant control unit producing redundant information in response to data from said fifth means; and
    (i) eighth means for transferring said redundant information produced by said redundant control unit to said redundant information terminals.

3. The microprocessor as claimed in claim 2, said redundant control unit includes:
    ninth means responsive to said first timing signal for fetching said redundant information on said redundant information terminal; and
    tenth means responsive to said forth timing signal for latching and transferring said redundant information produced by said control unit to said redundant information terminal.

4. The microprocessor as claimed in claim 1, further comprising:
    (h) a set of address terminals;
    (i) an internal address bus coupled to said instruction execution unit;
    (j) an address bus buffer coupled between said set of address terminals and said internal address bus for transferring address data on said internal address bus to said set of address terminals;
    (k) an additional redundant information terminal; and
    (l) means responsive to said address data for producing and supplying additional redundant information to said additional redundant information terminal.

5. The microprocessor as claimed in claim 4, wherein said address bus buffer includes:
    means responsive to a first address timing clock for fetching and address data on said internal address bus; and
    means responsive to a second address timing clock for transferring said address data to said set of address terminals.

6. A microprocessor comprising:
    (a) on a single semiconductor chip;
    (b) an execution unit for executing an instruction, said execution unit including means for generating a first timing signal and thereafter generating a second timing signal;
    (c) a set of data terminals;
    (d) means responsive to said first timing signal for fetching data on said set of data terminals;
    (e) means responsive to said second timing signal for transferring fetched data to said execution unit;
    (f) means for checking validity of said fetched data and producing a resultant signal representing whether or not said fetched data is valid before said second timing signal is generated; and
    (g) means for supplying said resultant signal to said execution unit.

7. The microprocessor as claimed in claim 6, wherein said supplying means receives a control signal and supplies said resultant signal to said execution unit when said control signal takes an active level and supplies a valid signal representing that said fetched data is valid to said execution unit irrespective of said resultant signal when said control signal takes an inactive level.

8. A microprocessor comprising:
    (a) on a single semiconductor chip;
    (b) a set of data terminals;
    (c) a redundant information terminal;

(d) an execution unit for processing data fetched from said set of data terminals;

(e) a redundant control unit coupled to said set of data terminals and said redundant information terminals for checking validity of data from said set of data terminals in response to information from said redundant information terminal and producing a checking resultant signal; and (f) means coupled between said redundant control unit and said execution unit and supplied with a redundant enable signal for transferring said checking resultant signal to said execution unit when said redundant enable signal assumes an active level and for supplying a signal representing that data is valid to said execution unit irrespective of said checking resultant signal when said redundant enable signal assumes an inactive level.

9. The microprocessor as claimed in claim 8, further comprising an enable control terminal, said redundant enable signal is supplied to said means through said enable control terminal from an outside of said semiconductor chip.

10. The microprocessor as claimed in claim 8, further comprising an enable control flag, said redundant enable signal is supplied to said means from said enable control flag.

* * * * *